March 4, 1924.

L. CHRISTY

RADIATOR SHIELD

Filed July 2, 1921

1,486,012

Inventor
Leo Christy
By
Geo. P. Kimmel. Attorney

Patented Mar. 4, 1924.

1,486,012

UNITED STATES PATENT OFFICE.

LEO CHRISTY, OF FRANKFORT, INDIANA

RADIATOR SHIELD.

Application filed July 2, 1921. Serial No. 482,108.

*To all whom it may concern:*

Be it known that I, LEO CHRISTY, a citizen of the United States, residing at Frankfort, in the county of Clinton and State of Indiana, have invented certain new and useful Improvements in Radiator Shields, of which the following is a specification.

This invention relates to radiator shields and more particularly to that class of structures arranged and mounted in front of and exterior to an automobile radiator to regulate the admission of air thereto.

The primary object of the invention resides in the construction of a radiator shield having independently movable sections inluding separable controls therefor whereby the admission of air to the radiator may be regulated from a position at the driver's seat of the vehicle.

Another and very important object of the invention is the construction of a novel and improved radiator shield having a plurality of independently operable slidable sections for regulating the admission of air to the radiator, including flexible controls for operating the respective sections and provision for maintaining the same in position from the driver's seat of the motor vehicle.

A still further object of the invention is the provision of a radiator shield designed for use and adapted to be installed on any type of automobile radiators and one in which the parts are extensively simple in construction, rigid and endurable, highly efficient in operation, practical yet capable of being manufactured at a very low cost whereby its commercial possibilities may be greatly enhanced.

This invention will best be understood from a consideration of the following detailed description taken in connection with the accompanying drawing forming a part of this specification, with the understanding, however, that the invention is not confined to any strict conformity with the showing, but may be changed and modified so long as such changes and modifications mark no material departure from the salient features of the invention as expressed in the appended claims.

In the accompanying drawings:—

Figure 1:
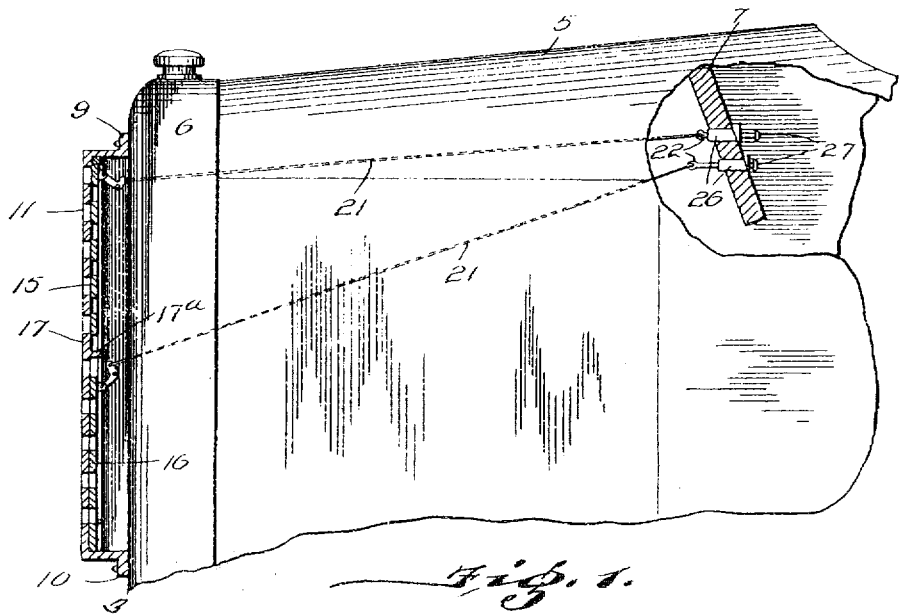
Figure 1 is a vertical sectional view showing the flexible control and the means for operating the same from the instrument board of the vehicle.
Figure 2:
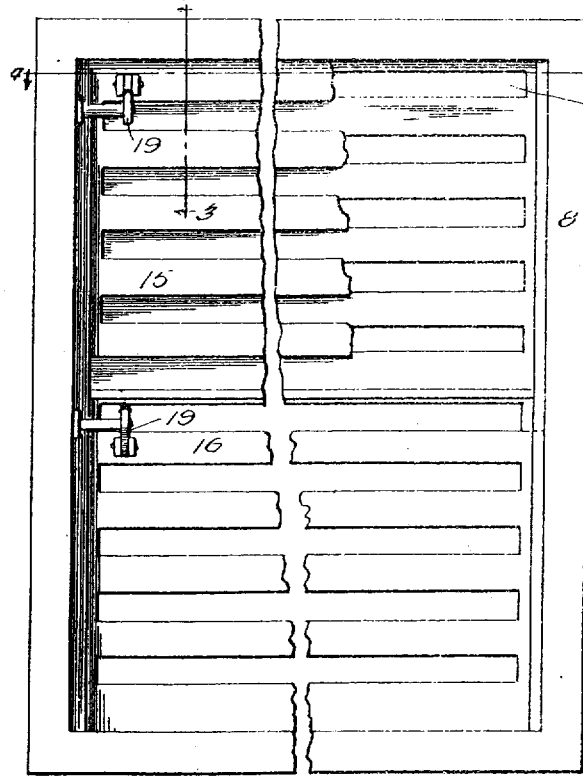
Fig. 2 is a front view of the shield.
Figure 3:
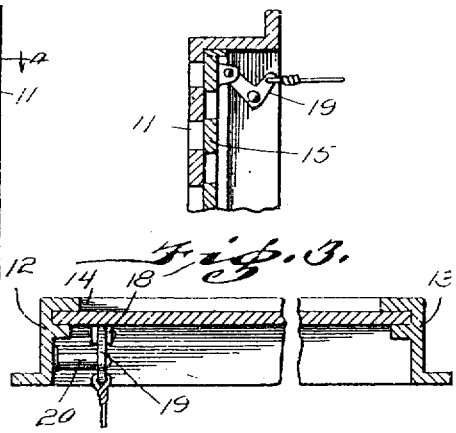
Fig. 3 is a detail view taken on the line 3—3 of Fig. 2.

Referring now to the drawings wherein like numerals designate like parts throughout the several views, 5 indicates the hood, and 6 the radiator of the conventional type of motor vehicle, the instrument board 7 being shown in section and arranged in proximity to the driver's seat whereby the radiator shield may be operated in the manner now to be described in detail.

The shield proper consists of a rectangular frame 8 having the usual top and bottom flanges 9, 10, whereby the shield may be attached to the radiator in the well known manner the said frame having a plurality of equally spaced openings 11 arranged from the top to the bottom of the same for the admission of air to the radiator as desired.

The respective sides 12 and 13 of the frame are each provided with a groove 14 wherein the top shutter section 15 and the bottom shutter section 16 may slide over the openings 11 of the frame and thus regulate the admission of air to the radiator.

The cross bar 17 of the frame intermediate of the height thereof is provided with a rearward lug or stop 17ª for the top section 15 and thus limits the movement thereof, it of course being understood that the slats of the shutters 15 and 16 are slightly wider than the openings 11 to thus properly close the same when operated as is well understood.

Figure 4:
Fig. 4 is a sectional view taken on the line 4—4 of Fig. 2.
Figure 5:
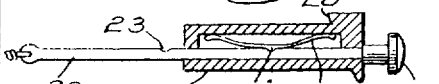
Fig. 5 is a detail view showing the adjusting device for the control.

Connected to the top slats of the respective upper and lower sections, 15, 16, I have provided attaching ears 18 for a pair of bell crank levers 19 which are pivotally mounted on short studs 20 extending inwardly of the side of the frame as clearly shown by Fig. 4 of the drawing. Connected to the opposite end of each bell crank lever I have provided a flexible element 21 the same extending rearwardly to an operating rod 22, said rod being provided with notches 23 for engagement with the rib 24 of the spring element 25 disposed within a housing 26 positioned and extending through the instrument board 7, said rod 22 having the usual operating knob 27 whereby the same may be moved inwardly to operate the bell crank lever and of course, both the upper and lower shutters to their proper position. If so desired the said housing may be formed in two sections to facilitate the positioning of the rod 22 and the flexible element 25 therein, it being observed that the front wall of the housing is inclined as shown at 28 to conform to the angularity of the instrument board 7 above referred to.

By reason of this construction either the upper or lower movable section 15, 16 may be actuated from a position at the driver's seat to permit the admission of air to the radiator and thus cool the same at the top or bottom or entirely as occasion may require.

The attachment or shield is of such construction as to permit the same to be readily attached to various types of radiators without in any way rearranging or removing any of the standard parts thereof.

Having shown and described my invention, what I now claim as new and desire to secure by Letters Patent of the U. S. is:—

1. The combination with an automobile radiator, of a shield wholly at the front thereof and comprising a rectangular frame having a plurality of transverse openings therein for the admission of air to and through the body of the radiator, a plurality of vertically movable independent groups of sections slidable over the openings and arranged exteriorly of the frame, and independent controls for the different groups of movable sections leading to the instrument board of the vehicle, whereby said groups of sections may be operated together or independently from a position at the driver's seat.

2. A radiator shield comprising a rectangular frame having transverse openings therein for the admission of air, the frame being adapted to be attached to the front exterior of the radiator and confined to such position, vertical grooves formed within the respective sides of the frame at the front thereof, a plurality of independently movable upper and lower sections arranged interiorly of the frame and exteriorly of the radiator and slidable within the grooves to open and close the openings of the frame, bell crank levers and flexible controls therefor for operating the upper and lower sections.

In testimony whereof, I affix my signature hereto.

LEO CHRISTY.